United States Patent
Rolt

(10) Patent No.: US 6,661,582 B1
(45) Date of Patent: Dec. 9, 2003

(54) OPTICAL TRANSMITTER AND ANAMORPHIC LENS THEREFOR

(75) Inventor: Stephen Rolt, Hertfordshire (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/166,821

(22) Filed: Jun. 11, 2002

(51) Int. Cl.[7] .............................................. G02B 13/08
(52) U.S. Cl. ..................................................... 359/668
(58) Field of Search ................................. 359/668, 641, 359/669, 670, 671

(56) References Cited

U.S. PATENT DOCUMENTS 6,542,314 B2 * 4/2003 Kawabata et al. .......... 359/668

* cited by examiner

*Primary Examiner*—Hung Xuan Dang
(74) *Attorney, Agent, or Firm*—Barnes & Thornburg

(57) ABSTRACT

An anamorphic lens for correcting aberration of a highly divergent beam from a laser source has first and second cylindrical surfaces having mutually perpendicular planes of symmetry. Each surface is defined from a generator polynomial including cross terms in two variables so as to correct aberration of light from a widely divergent source. Preferably, the generator polynomial is of the form $$z = \frac{x^2}{R_x + \sqrt{R_x^2 - (1+k_x)y^2}} + \frac{y^2}{R_y + \sqrt{R_y^2 - (1+k_y)y^2}} + \alpha_{10}x^2 + \alpha_{01}y^2 + \alpha_{20}x^4 + \alpha_{11}x^2y^2 + \alpha_{02}y^4 + \alpha_{30}x^6 + \alpha_{21}x^4y^2 + \alpha_{12}x^2y^4 + \alpha_{03}y^6 ...$$

The coefficients in this polynomial may be determined by the use of ray tracing software. The lens may be employed as a collimating lens in an optical transmitter e.g. for use in an amplifier package.

13 Claims, 3 Drawing Sheets

Effect of Ellipticity

OPTICAL TRANSMITTER AND ANAMORPHIC LENS THEREFOR

FIELD OF THE INVENTION

This invention relates to optical transmitters for use in communications systems, and to anamorphic lenses for use in such transmitters.

BACKGROUND OF THE INVENTION

The bandwidth explosion driven by Internet usage has created a demand for an adaptable, high performance optical network. One of the key technologies in delivering high performance over a long haul network is pump laser technology, particularly Raman Laser technology. From a market perspective, device output power is the most important performance characteristic of such devices. There is considerable commercial pressure to maximise the overall device output power and efficiency. It is of course an advantage to operate at high laser powers as this can increase the spacing between amplifier stations in an amplified system and thus provide a significant cost reduction. Unfortunately, high power laser sources tend to produce highly elliptical beam and highly divergent shapes which, for the reasons discussed below, substantially reduce the coupling efficiency and hence the effective device output power. In particular, it has been found that the high power lasers now becoming available have such a high degree of beam divergence and ellipticity that this cannot be fully corrected by the use of conventional anamorphic lenses.

A typical optical transmitter comprises a laser capable of producing a divergent beam, and a lens whereby that divergent beam is collimated into a parallel beam for launch into an optical wave guide. In general, the laser output comprises an elliptical beam, and it has been found that this ellipticity increases as higher power laser are employed. This is a particular problem as high beam ellipticity substantially reduces the coupling efficiency of the laser output into a circular fibre. Lack of overlap between the elliptical laser beam and the fibre mode reduces the coupling efficiency. This effect is illustrated in FIGS. 1a to 1c of the accompanying drawings. FIG. 1a is a cross-sectional view of an elliptical laser beam 10. FIG. 1b is a cross-sectional view of a typical optical fibre core 12 which is substantially circular in cross section. FIG. 1c shows the mismatch effect in which the lobes 10a, 1b, fail to enter the fibre or waveguide 12 and thus represent lost energy. If for example the ellipticity of the laser beam is e, then the maximum theoretical coupling efficiency into a circular cross section fibre is given by the expression:

$$MaxEfficiency = \frac{4e}{[1+e]^2}$$

For a typical laser beam ellipticity of about 3.0, the coupling efficiency is thus reduced to about 75%, which translates into a loss of 1.25 dB without taking into account other losses. Since, for most pump laser products, output power is an exceptionally strong market driver, there is great incentive to solve this problem. To correct this loss of efficiency resulting from beam ellipticity, a number of workers have employed anamorphic lenses in conjunction with the laser. In a conventional anamorphic lens design, the two lens surfaces are crossed toroidal surfaces. An example of an anamorphic lens might for example be crossed cylinders, each of appropriate radius of curvature. One surface may comprise a cylindrical lens surface that collimates the laser beam in one plane and the second surface is a cylindrical lens that collimates the beam in the orthogonal plane. A general expression for the surface contour of each surface of such a lens is typically a polynomial expression of the form:

$$2) \; z = \frac{y^2}{R_y + \sqrt{R_y^2 - (1+k_y)y^2}} +$$
$$\alpha_1 y^2 + \alpha_2 y^4 + \alpha_3 y^6 + \alpha_4 y^8 + \alpha_5 y^{10} + \alpha_6 y^{12} + \ldots$$

$$3) \; z = \frac{x^2}{R_x + \sqrt{R_x^2 - (1+k_x)x^2}} + \alpha_1 x^2 + \alpha_2 x^4 + \alpha_3 x^6 +$$
$$\alpha_4 x^8 + \alpha_5 x^{10} + \alpha_6 x^{12} + \ldots$$

The first term on the left of each expression represents the curvature of the respective lens surface, and the remaining polynomial terms provide aberration correction. However, it has been found that the above designs only provide effective aberration correction along the x and y axes. The even aspheric surfaces set out in equations 2) and 3) provide aberration correction using a respective conic term, $k_x$ or $k_{y1}$, plus even polynomial terms, a sufficient number of terms being taken to achieve the desired accuracy. For the sake of simplicity, one can regard the quadratic terms as supplying the lens curvature, whereas any quartic terms may be thought of as applying correction for third order aberration, and so on.

Aberration is often expressed as a wave front distortion, in which case, the amount of distortion is proportional to the fourth power of the lens NA (numerical aperture) and the focal length. A good rule of thumb for substantially 'aberration free' performance is that the wave distortion must not exceed $\lambda/4$ across the aperture. To demonstrate the lack of efficiency of a conventional lens structure, a ray tracing program was used to calculate the distortion for a typical anamorphic lens at 45° to the vertical and horizontal planes. This lens had a refractive index of 1.87, a correction ratio (anamorphic ratio) of 2.56 and a geometric mean focal length of 1 mm.

This calculation revealed that the wave front distortion at 1.48 $\mu$m is given by:

4) $\Delta\phi = 41 NA_x^2 NA_y^2$ (in waves)

Where $NA_x$ is the horizontal numerical aperture in waves and $NA_y$ is the vertical numerical aperture. It is convenient to express equation 4) in terms of a 'geometrical' numerical aperture defined by:

5) $NA_g = \sqrt{NA_x NA_y}$

Thus, expressing equation 4) in terms of the geometrical NA, we have:

6) $\Delta\phi = 41 NA_g^4$ for the $\lambda/4$ condition to be fulfilled, then:

7) $41 NA_g^4 < 0.25$ or $NA_g < 0.27$.

For a typical current laser design, $NA_x = 0.144$ and $NA_y = 0.387$, giving $NA_g = 0.24$. This is just within the 'limit' defined above. However, future higher power laser chip designs will have a much higher NA in order to maximise ex-facet power. For these designs, the current anamorphic lens design will no longer be effectively aberration free. Although current lens designs can correct aberration in the horizontal and vertical planes, they are, when presented with a highly divergent elliptical beam, significantly less effective in the correction of aberration in the planes at 45° to the horizontal and vertical planes. This reduces the energy that can be coupled into a circular cross-section fibre and partially negates the advantage of introducing a high power source.

OBJECT OF THE INVENTION

An object of the invention is to overcome or at least to mitigate the above disadvantage.

A further object of the invention is to provide an improved anamorphic lens construction.

A further object of the invention is to provide an improved optical pump source for an amplifier.

SUMMARY OF THE INVENTION

According to a first aspect of the invention there is provided an anamorphic lens having first and second curved surfaces having mutually perpendicular planes of symmetry, wherein each said surface is defined from a generator polynomial including cross terms in first and second independent variables so as to correct aberration of light from a widely divergent source.

The generator polynomial comprises a function defining the curvature of the surface summed with a plurality of polynomial terms providing correction of aberration.

In a preferred embodiment, each lens surface is defined by a polynomial expression of the form, $$z = \frac{x^2}{R_x + \sqrt{R_x^2 - (1+k_x)y^2}} + \frac{y^2}{R_y + \sqrt{R_y^2 - (1+k_y)y^2}} + \alpha_{10}x^2 + \alpha_{01}y^2 +$$
$$\alpha_{20}x^4 + \alpha_{11}x^2y^2 + \alpha_{02}y^4 + \alpha_{30}x^6 + \alpha_{21}x^4y^2 + \alpha_{12}x^2y^4 + \alpha_{03}y^6 \ldots$$

The coefficients in this polynomial may be determined by the use of ray tracing software.

According to another aspect of the invention there is provided a method of fabricating an anamorphic lens having first and second cylindrical surfaces having mutually perpendicular planes of symmetry, wherein each said surface is defined from a generator polynomial including cross terms in first and second independent variables so as to correct aberration of light from a widely divergent source, the method comprising: generating a trial design, and selectively adjusting coefficients in the polynomial corresponding to that trial design so as to optimise the lens design so as to provide a minimised wave front distortion.

In another aspect, the invention provides an improved anamorphic lens design for the efficient coupling of laser radiation from optoelectronic devices into optical fibres and other waveguide devices. More particularly, the lens manipulates the highly elliptical beam produced by high power laser sources to produce an almost circular parallel beam suitable for efficient coupling into optical fibres and other waveguide devices. The configuration of the lens surfaces is designed to minimise aberration.

In a preferred embodiment, the anamorphic lens provides collimation of a pump laser beam in a Raman amplifier assembly e.g. for use in an optical communications system.

The lens surface may be formed by micro-machining either the lens itself or a ceramic mould employed to manufacture the lens.

BRIEF DESCRIPTION OF THE DRAWINGS

A preferred embodiment of the invention and the best known method of putting the invention into practice will now be described with reference to the accompanying drawings in which.

DESCRIPTION OF PREFERRED EMBODIMENT

Figure 1A:
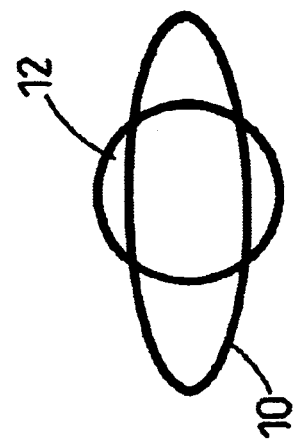
FIGS. 1a to 1c are set of schematic diagrams illustrating the effect of laser beam ellipticity and showing the effect of mismatch with a circular cross-section fibre.
Figure 1B:
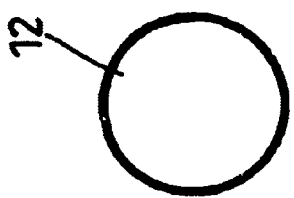
Figure 1C:
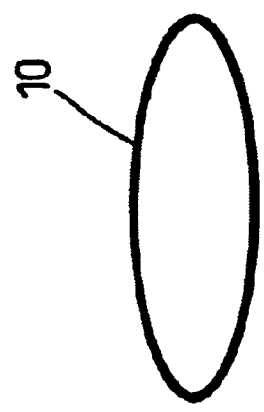

FIGS. 1a to 1c have been discussed above and are included for comparative and explanatory purposes.

Figure 2A:
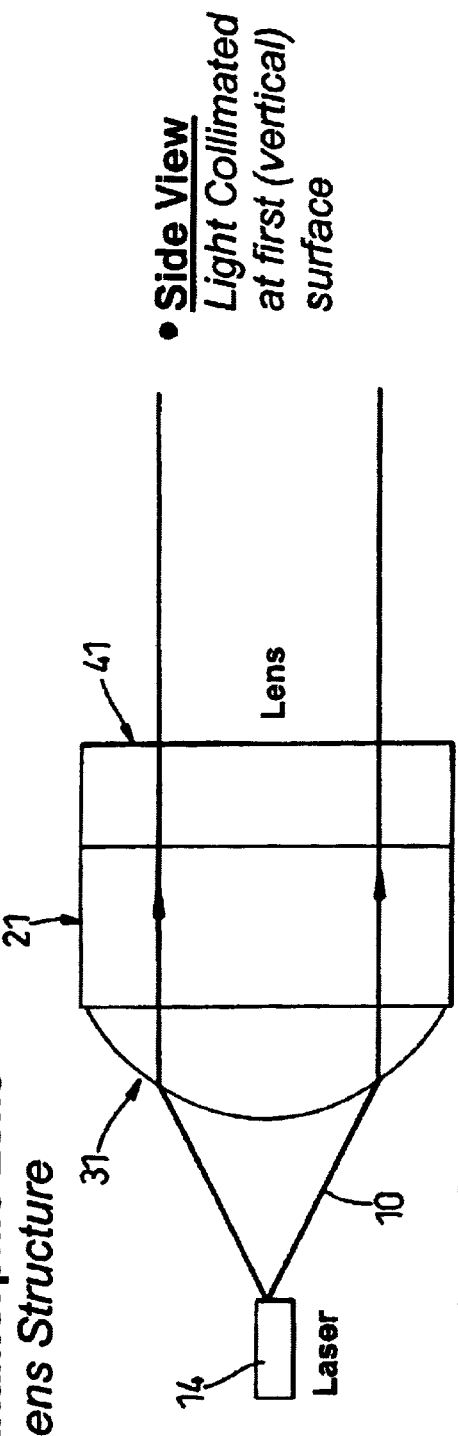
FIGS. 2a and 2b are respectively side and top cross sectional views of an anamorphic lens according to a preferred embodiment of the invention.
Figure 2B:
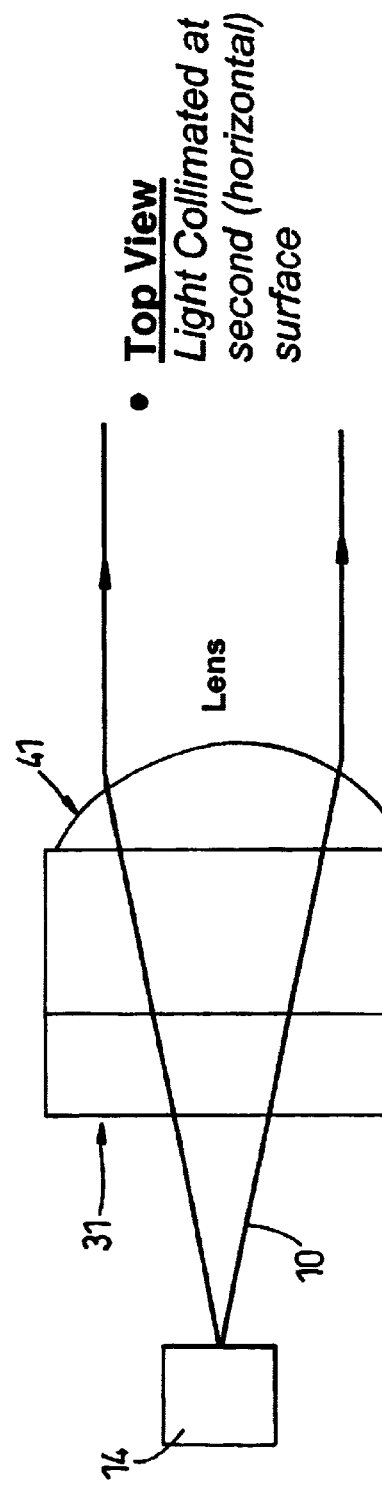

Referring now to FIGS. 2a and 2b, these figures together show the construction of the anamorphic lens. The general form of the lens 21 is that of two crossed, non-circular, cylindrical surfaces 31, 41 (referred to as the x and y surfaces). The diagram above shows a side view and a top view. The side view of FIG. 2a illustrates the collimation in the vertical plane of the elliptical beam 10, output from the laser 14 by the first cylindrical surface 31 (the x surface). The second surface 41 (the y surface) is oriented at 90 degrees to the x surface and provides collimation in the horizontal plane.

Each of the cylindrical surfaces 31, 41 is defined by a respective polynomial expression. In addition to the terms in powers of x and y, this polynomial also incorporates 'cross terms' in x and y. The inclusion of these cross terms in the generating polynomial has been found to provide correction of aberration over the entire lens surface, in the 45° planes as well as in the x and y planes. As a result, the general lens surface is given by the expression:

$$z = \frac{x^2}{R_x + \sqrt{R_x^2 - (1+k_x)y^2}} + \frac{y^2}{R_y + \sqrt{R_y^2 - (1+k_y)y^2}} + \alpha_{10}x^2 + \alpha_{01}y^2 +$$
$$\alpha_{20}x^4 + \alpha_{11}x^2y^2 + \alpha_{02}y^4 + \alpha_{30}x^6 + \alpha_{21}x^4y^2 + \alpha_{12}x^2y^4 + \alpha_{03}y^6 \ldots$$

Optimisation of the above parameters can be made by using ray tracing software. A suitable software package for this purpose is the Zemax Optical Design Program from Focus Software Inc.

The ray tracing package permits the use of optimisation procedures to define the lens parameters. In this optimisation procedure, an attribute, such as the RMS wave front distortion, is selected and the lens parameters are automatically adjusted by the software to seek the global minimum value of that attribute. In this specific case, lens parameters, such as the conic parameters, and a limited number of the $\alpha_{nm}$ terms in the above expression, are adjusted to seek the minimum value of the wave front distortion.

The first stage in this optimisation process is to define a 'merit function'. As suggested earlier, the merit function is based on the wave front distortion. More specifically, a list of points within the lens aperture is defined by the user and the optical path difference relative to the lens centre is calculated for each point by the software. In addition, each point in the list is ascribed a weight (its relative importance). Points closer to the centre of the lens are given more weight than those at the edge. In fact, the weighting function mirrors the intensity distribution of the laser.

The software can very rapidly calculate the merit function for any iteration in the lens design. This merit function is the square root of the weighted sum of the squares for all the points. Of course for the perfect design, where there is no wave front distortion, the merit function would be zero, since all the individual points would have zero optical path difference. In practice a minimum non-zero value is achieved.

The procedure commences with a trial design which is then optimised. During the optimisation procedure, the program will automatically vary one of the parameters, for example $\alpha_{11}$. The program will automatically vary $\alpha_{11}$ until a minimum value of the merit function has been reached. The program will subsequently vary other parameters in turn until the merit function has been optimised with respect to these parameters. The user can chose which of the parameters to optimise and which are allowed to be varied automatically by the program. At the end of the process, a global minimum for the merit function (wavefront distortion) will have been found and an optimised design achieved.

Formation of the lens surfaces themselves can be carried out by a micromachining process either of a ceramic mould used to produce the lens, or the lens itself directly, For example, each lens surface may be diamond machined or etched either chemically or using a focussed ion beam. The lens may comprise a glass or transparent plastics material.

Table 1 below illustrates the improvement in coupling efficiency achieved by the lens construction even for highly divergent sources. The two right hand columns in the table indicate respectively the coupling efficiency for uncorrected aberration and aberration corrected by the lens structure described herein.

TABLE 1

| Device | Horizontal Divergence° | Vertical Divergence° | Ratio | Uncorrected Aberration | Corrected Aberration |
|---|---|---|---|---|---|
| Laser 1 | 9.6 | 26.7 | 2.79 | 0.830 | 0.99 |
| Laser 2 | 8.5 | 22.3 | 2.64 | 0.946 | 0.99 |
| Laser 3 | 6.9 | 26.0 | 3.78 | 0.958 | 0.99 |

Figure 3:
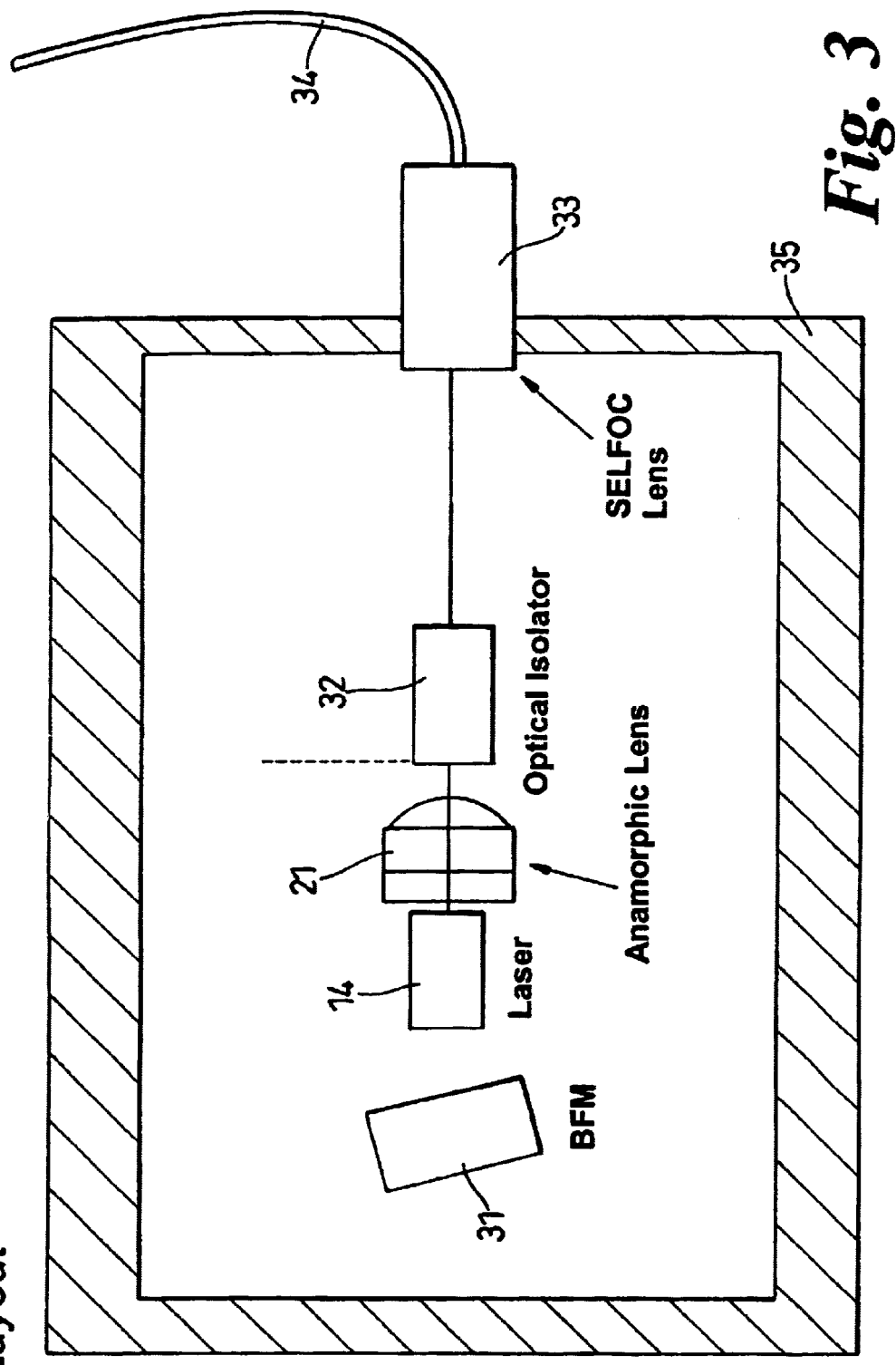
FIG. 3 shows a pump laser and Raman amplifier assembly incorporating the anamorphic lens of FIGS. 2a and 2b.

By way of further example, FIG. 3 shows the construction of a Raman amplifier assembly incorporating the anamorphic lens of FIGS. 2a and 2b. As shown in FIG. 3, the laser 14 is provided with a back facet monitor 31 and is arranged in line with anamorphic lens 21 so as to collimate the laser output into a parallel beam of circular cross section. The collimated beam is directed via an optical isolator 32 and a SELFOC lens 33 into an amplifying fibre 34. The structure is supported on a package mount 35. The amplifier assembly may be incorporated in an optical transmission system.

It will be understood that the above description of a preferred embodiment is given by way of example only and that various modifications may be made by those skilled in the art without departing from the spirit and scope of the invention.

What is claimed is:

1. An anamorphic lens having first and second curved surfaces having mutually perpendicular planes of symmetry, wherein each said surface is defined from a generator polynomial including cross terms in first and second independent variables so as to correct aberration of light from a divergent source.

2. An anamorphic lens as claimed in claim 1, wherein the generator polynomial comprises a function defining the curvature of the surface summed with a plurality of polynomial terms providing correction of aberration.

3. An anamorphic lens as claimed in claim 2, wherein each said surface is defined by a polynomial expression of the form, $$z = \frac{x^2}{R_x + \sqrt{R_x^2 - (1+k_x)y^2}} + \frac{y^2}{R_y + \sqrt{R_y^2 - (1+k_y)y^2}} + \alpha_{10}x^2 + \alpha_{01}y^2 + \alpha_{20}x^4 + \alpha_{11}x^2y^2 + \alpha_{02}y^4 + \alpha_{30}x^6 + \alpha_{21}x^4y^2 + \alpha_{12}x^2y^4 + \alpha_{03}y^6...$$

4. An anamorphic lens as claimed in claim 3, and comprising a glass or plastics material.

5. An anamorphic lens as claimed in claim 4, and formed by casting from a ceramic mould.

6. An optical source incorporating a laser and an anamorphic collimating lens as claimed in claim 1.

7. An optical amplifier package incorporating an optical source as claimed in claim 6.

8. An optical communications system incorporating an amplifier package as claimed in claim 7.

9. A method of designing an anamorphic lens having first and second cylindrical surfaces having mutually perpendicular planes of symmetry, wherein each said surface is defined from a generator polynomial including cross terms in first and second independent variables so as to correct aberration of light from a widely divergent source, the method comprising: generating a trial design, and selectively adjusting coefficients in the polynomial corresponding to that trial design so as to optimise the lens design so as to provide a minimised wave front distortion.

10. A method as claimed in claim 9, wherein each said surface is defined by a polynomial expression of the form, $$z = \frac{x^2}{R_x + \sqrt{R_x^2 - (1+k_x)y^2}} + \frac{y^2}{R_y + \sqrt{R_y^2 - (1+k_y)y^2}} + \alpha_{10}x^2 + \alpha_{01}y^2 + \alpha_{20}x^4 + \alpha_{11}x^2y^2 + \alpha_{02}y^4 + \alpha_{30}x^6 + \alpha_{21}x^4y^2 + \alpha_{12}x^2y^4 + \alpha_{03}y^6...$$

11. A method as claimed in claim 10, wherein the coefficients of the polynomial expression are determined via a ray tracing program.

12. A method as claimed in claim 11, wherein the lens is cast from a shaped ceramic mould.

13. An anamorphic lens designed by a method as claimed in claim 9.

* * * * *